United States Patent [19]

Thommes

[11] Patent Number: 5,086,205
[45] Date of Patent: Feb. 4, 1992

[54] APPARATUS EMPLOYING A WELDING POWER SUPPLY FOR POWERING A PLASMA CUTTING TORCH

[75] Inventor: James M. Thommes, Escondido, Calif.

[73] Assignee: Powcon, Inc., San Diego, Calif.

[21] Appl. No.: 499,020

[22] Filed: Mar. 26, 1990

[51] Int. Cl.$^5$ .............................................. B23K 9/00
[52] U.S. Cl. ........................ 219/121.54; 219/121.57; 219/121.39; 219/130.1
[58] Field of Search .................... 219/121.54, 121.57, 219/75, 121.48, 130.1, 130.40, 130.33, 130.31

[56] References Cited

U.S. PATENT DOCUMENTS

| Re. 31,544 | 3/1984 | Hedberg | 219/130.1 |
|---|---|---|---|
| 3,530,359 | 9/1970 | Grist | 321/5 |
| 3,728,516 | 4/1973 | Daspit | 219/131 R |
| 4,117,303 | 9/1978 | Hedberg | 219/130.1 |
| 4,280,041 | 7/1981 | Kiessling et al. | 219/121.54 |
| 4,300,035 | 11/1981 | Johansson | 219/130.21 |
| 4,300,036 | 11/1981 | Johansson | 219/130.33 |
| 4,382,171 | 5/1983 | Hedberg | 219/130.1 |
| 4,397,147 | 8/1983 | Turchi | 219/121.57 |
| 4,410,788 | 10/1983 | Summers et al. | 219/75 |
| 4,678,888 | 7/1987 | Camacho et al. | 219/130.4 |

FOREIGN PATENT DOCUMENTS 1449269  1/1989  U.S.S.R. .......................... 219/121.57

OTHER PUBLICATIONS

"Instructions for Plasma Cutting Package for Heliarc 250HF Power Supply," L-TEC Welding & Cutting Systems, Florence, S.C.
"The Boost Converter," Chapter 3, pp. 51–54, from Modern DC-to-DC Switch Mode Power Converter Circuits, by Severns and Bloom (1985).
Patent Application Ser. No. 204,640, filed Jun. 9, 1988 for "System for Supplying Power," inventor: James M. Thommes.
Divisional Patent Application Ser. No. 443,888, filed 11/30/89 for "System for Supplying Power", inventor: James M. Thommes.

Primary Examiner—Mark H. Paschall
Attorney, Agent, or Firm—Majestic, Parsons, Siebert & Hsue

[57] ABSTRACT

A boosting circuit is used to boost the voltage output of a DC selding power supply to a higher voltage output adequate for powering a plasma cutting torch. The boosting circuit includes a first inductive stage including an inductor receiving energy from a DC welding power supply. The boosting circuit also includes a capacitive second stage receiving energy from the inductor in the first stage where the two stages together boost the output of the boosting circuit to a voltage output higher than that supplied by the welding power supply.

28 Claims, 5 Drawing Sheets

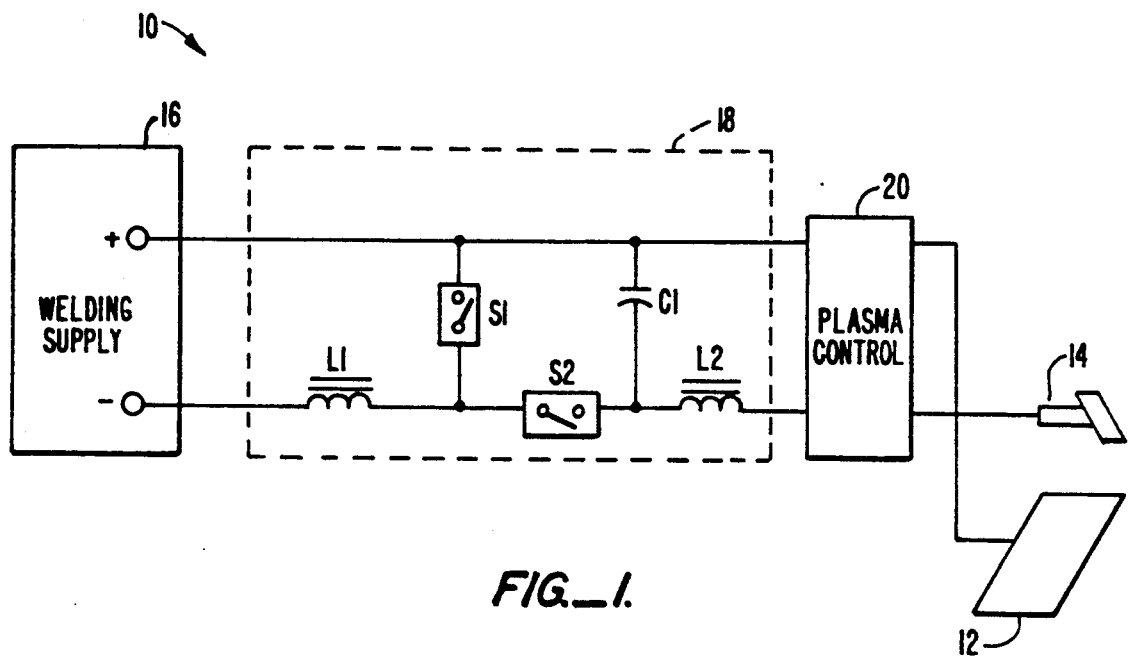
FIG._1.
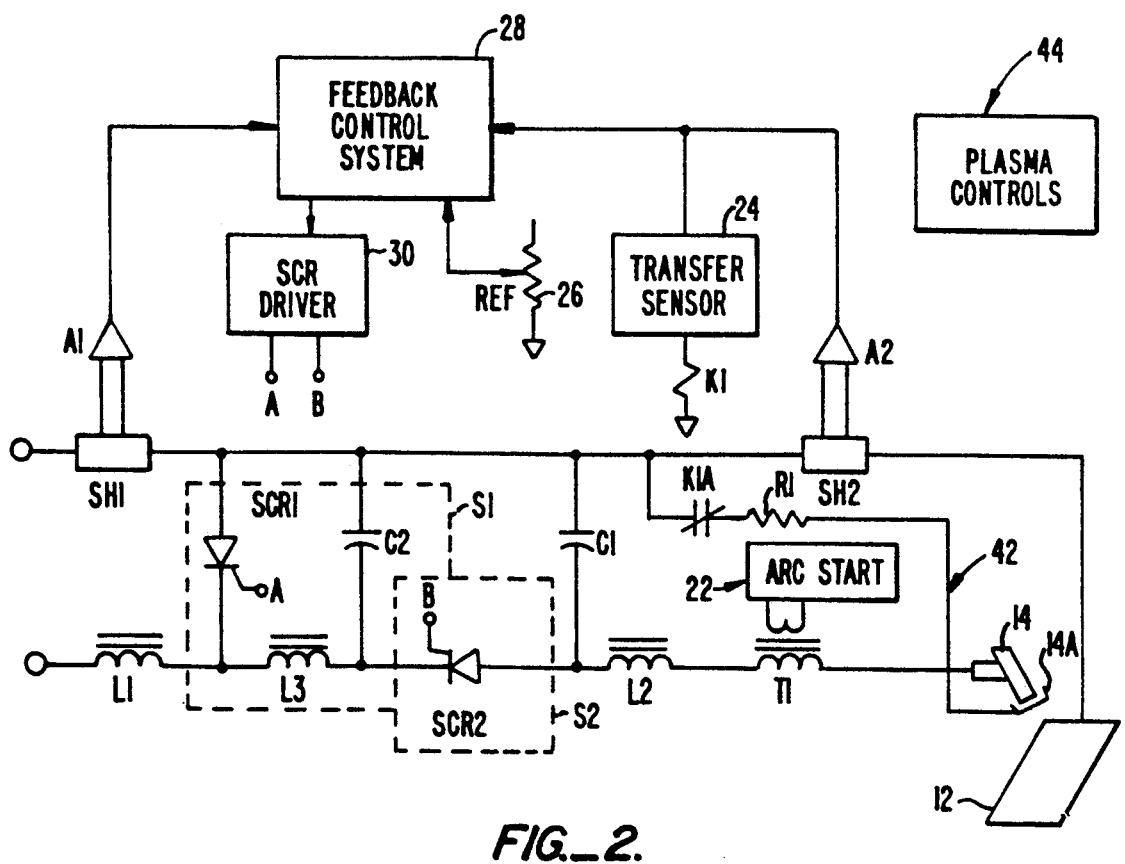
FIG._2.

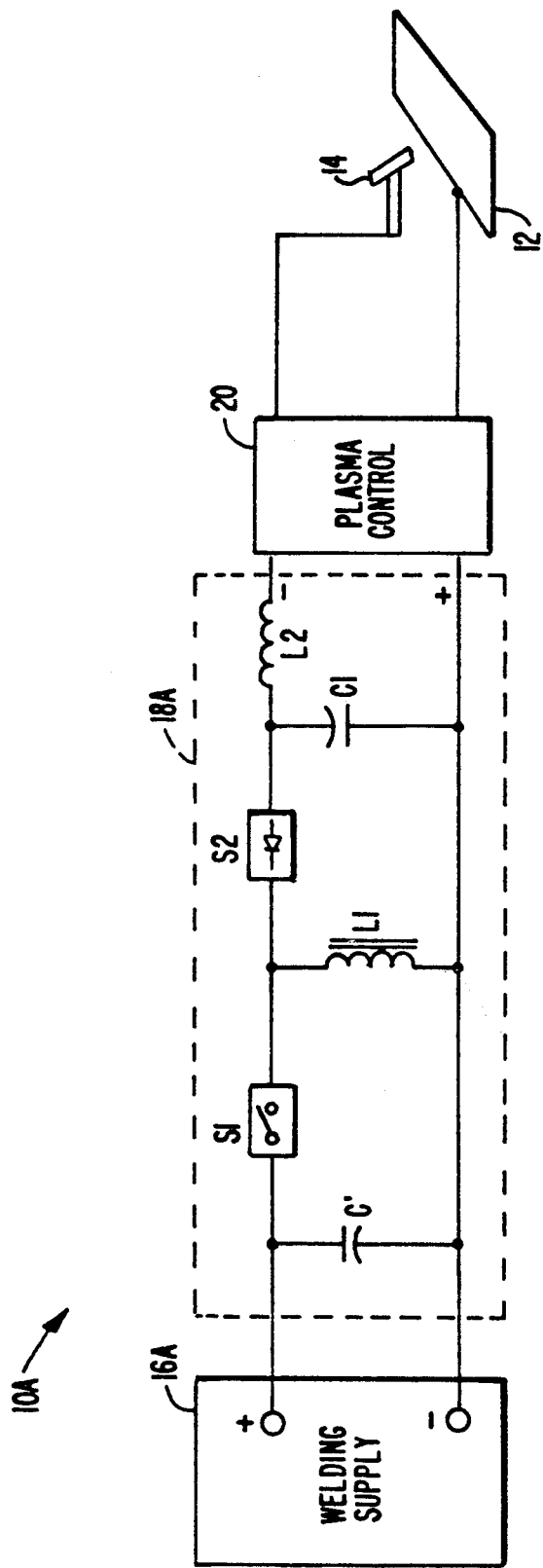
FIG._3.

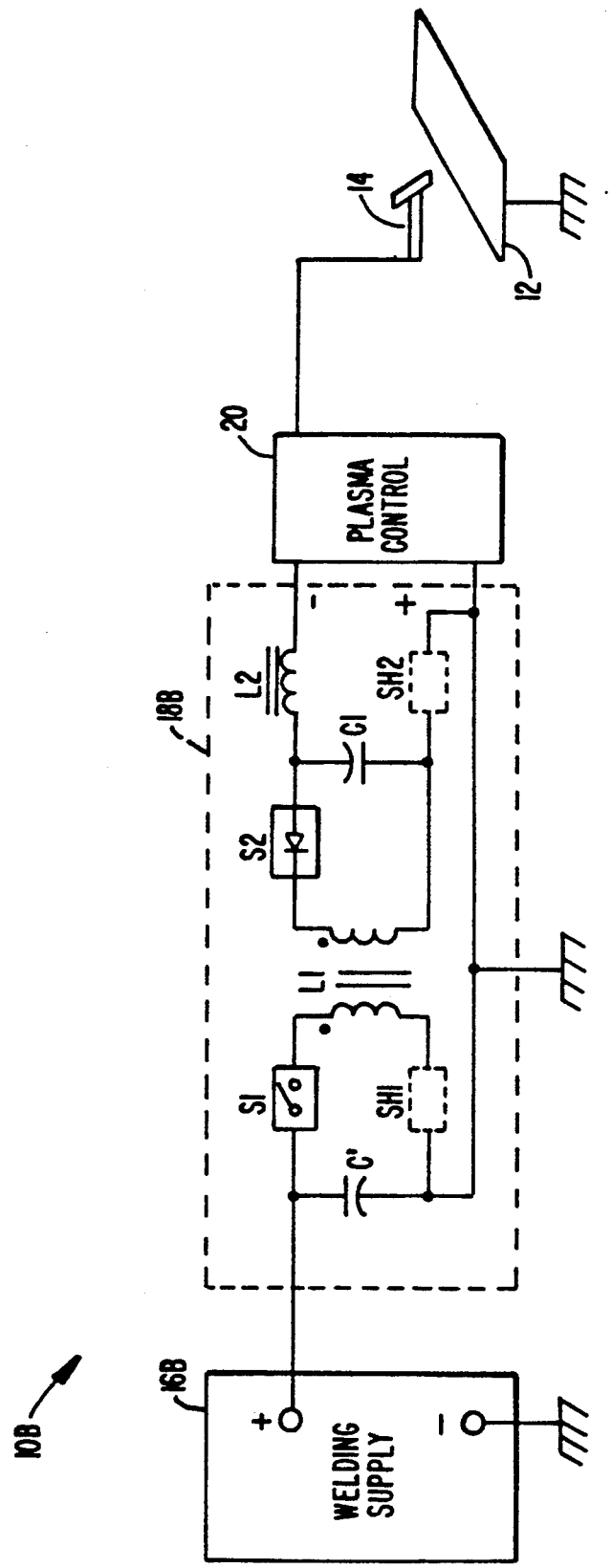
FIG._4.

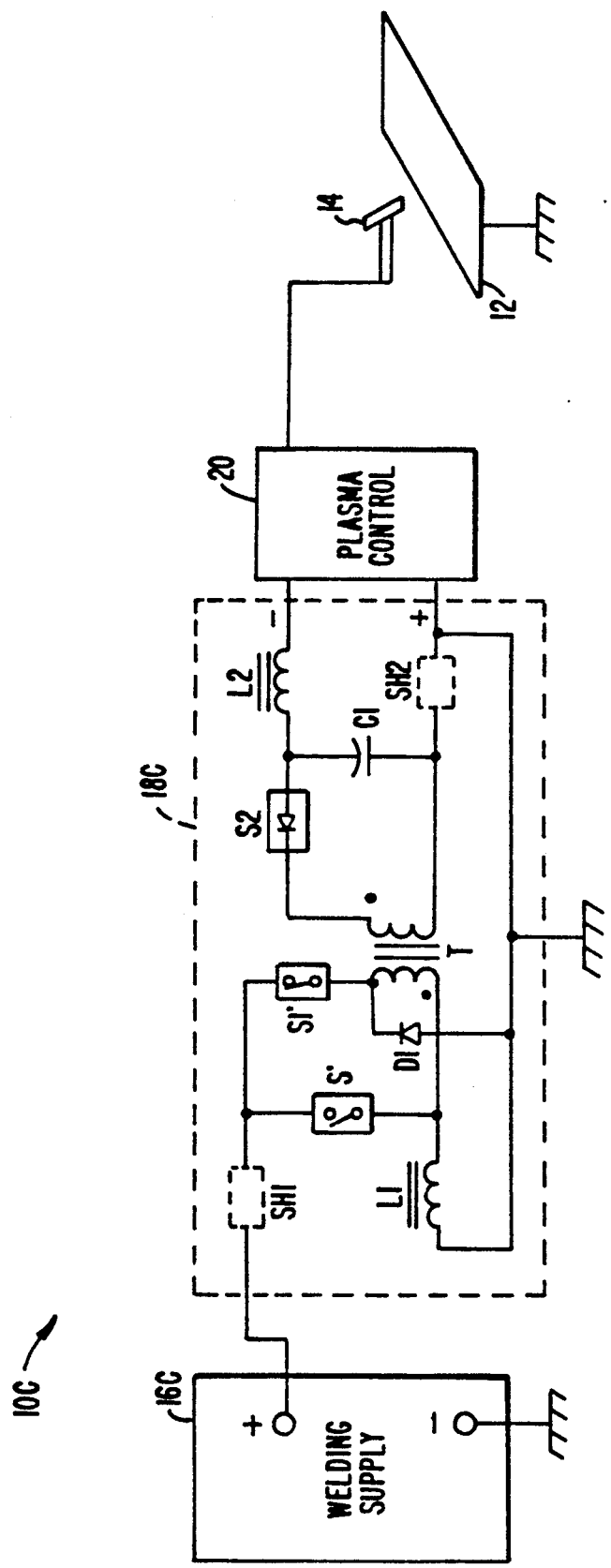
FIG._5.

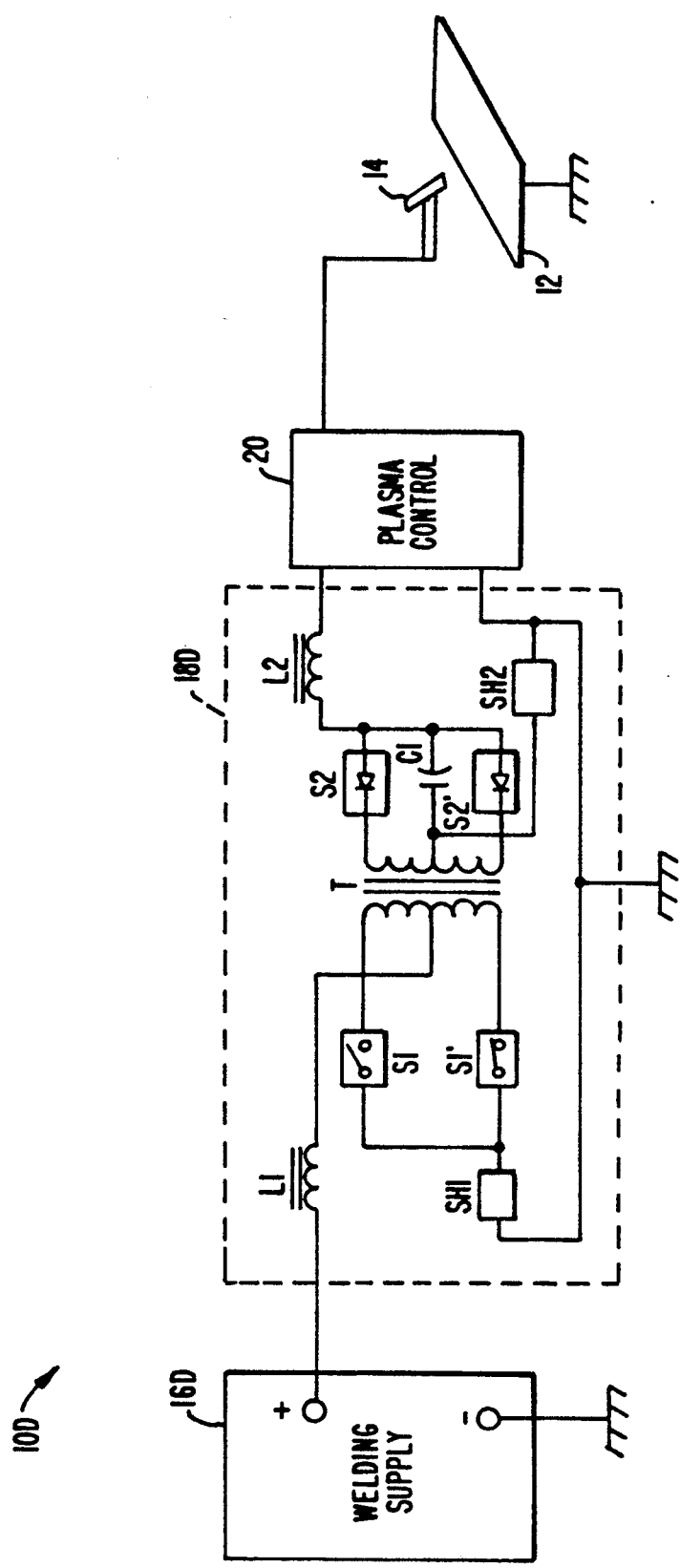
FIG._6.

ID=5,086,205

APPARATUS EMPLOYING A WELDING POWER SUPPLY FOR POWERING A PLASMA CUTTING TORCH

BACKGROUND OF THE INVENTION

This invention relates in general to power supplies and, in particular, to a plasma cutting torch power supply.

The metal working industry uses welding power supplies for joining metal members and structures. Plasma cutting is used to cut and prepare parts to be welded in some fashion in a welding process. Therefore, arc welding and plasma cutting are two processes which are frequently used together in many applications in the metal working industry. Both processes require power supplies which supply power of certain characteristics to welding torches or to cutting torches. To supply power for both processes, two separate power supplies have been used in conventional systems, one for performing plasma cutting and the other for performing arc welding. Plasma cutting requires a power source which provides power at high voltages and low current: for example, for cutting metal of up to one-half inch, the voltage and current supplied are typically at 100-120 volts and 20-50 amperes. On the other hand, arc welding requires a power source which can provide power at high current and low voltage, typically at 250 amperes and 20-30 volts for welding metal of up to one-half inch in thickness. Because of these different requirements for plasma cutting and arc welding, two separate power supplies have been used in conventional welding and cutting systems.

As explained above, welding requires a power supply which supplies high current at low voltage. The cutting process, however, requires a power supply for supplying low current but at high voltage. The output voltage of an ordinary welding power supply is not high enough for the plasma cutting process. Therefore, in conventional metal working, in order to perform plasma cutting, a completely separate plasma cutting power supply would have to be purchased. On construction sites where welding power supplies are engine-driven, there may not be any utility power at the proper voltage available for the plasma-cutting power supply. It is therefore desirable to provide a plasma cutting power supply where the above-described difficulties are not present.

In a conventional plasma cutting process, compressed air is normally used to both cool the torch and form a plasma through which an arc can pass to accomplish cutting. Compressed air is normally used since it is inexpensive and requires no special handling.

In the Heliarc 250HF Power Supply from L-TEC Welding and Cutting Systems of Florence, S.C., the voltage of the power supply required for the cutting process is lowered by adding argon to compressed air for cooling the torch as well as forming the plasma. By using a mixture of compressed argon and air, the resistance between the cutting torch and the workpiece is lowered, thereby also lowering the voltage required to sustain the cutting arc. Thus by changing the cutting process, L-TEC proposes a power supply where the voltage required for cutting is lower than that required for the conventional cutting process.

Using a mixture of compressed argon and air, however, can result in poor quality cuts. Also, an expensive gas such as argon is required. The power supply proposed by L-TEC is therefore not completely satisfactory. It is therefore desirable to provide an improved plasma cutting power supply in which the above-described difficulties are alleviated.

SUMMARY OF THE INVENTION

This invention is based on the observation that by boosting the output voltage of a conventional direct current (DC) power supply to a level suitable for powering a plasma torch cutting process, the need for purchasing a separate plasma cutting power supply is eliminated. Furthermore, unlike the above-described L-TEC cutting power supply, no expensive gas is required. Moreover, the cutting performed using such a power supply would be performed at high voltage, resulting in high quality cuts. Even at construction locations where no utility power is available, power required for cutting may be supplied by engine-driven welding power supplies.

The apparatus of this invention is suitable for supplying power to a plasma cutting torch to cut a workpiece. The apparatus comprises a DC welding power supply for supplying a first voltage output and voltage boosting means responsive to the first voltage output to supply a second voltage output higher than the first voltage output. The second voltage output is suitable for powering the cutting torch to cut the workpiece.

In the preferred embodiment, the voltage boosting means includes a first stage including an inductor for storing energy supplied by the welding power supply at the first voltage. The voltage boosting means also includes a second stage including a capacitor for receiving and storing energy transferred from the first stage and for supplying an output voltage for powering the plasma cutting torch. The two stages cause the output voltage of the apparatus to be higher than the first voltage supplied by the welding power supply.

BRIEF DESCRIPTION OF THE DRAWINGS

FIG. 1 is a block diagram of a power supply for supplying power to a plasma cutting torch to illustrate the invention. The power supply of FIG. 1 includes a DC welding power supply and voltage boosting circuit.

FIG. 2 is a more detailed circuit diagram of the boosting circuit of FIG. 1 to illustrate the invention.

FIGS. 3-6 are schematic circuit diagrams of four different implementations of the circuit of FIG. 1 to illustrate four different embodiments.

DETAILED DESCRIPTION OF THE INVENTION

FIG. 1 is a functional block diagram of an apparatus 10 for supplying power to a plasma cutting torch 14 in order to cut a workpiece 12. As shown in FIG. 1, the apparatus 10 includes a DC welding power supply 16 and a voltage boosting circuit 18. As shown in FIG. 1, when the power supplied by welding supply 16 is applied to the torch and workpiece through circuit 18, circuit 18 boosts the output voltage applied between the workpiece and the torch to a value sufficiently high for quality cuts to be performed on the workpiece while only compressed air is used for the plasma gas. By adding a boosting circuit 18 in the manner shown in FIG. 1, a welding power supply 16 otherwise only useful for powering a welding torch may now be used also for supplying for cutting as well. Therefore, a single welding power supply is adequate for powering both the welding and cutting processes. No utility power is required and the same welding power supply may be engine-driven, as before, but now adapted for powering a cutting torch. No expensive gas is required in addition to compressed air. Quality cutting is achieved since the cutting is performed at high voltage.

As shown in FIG. 1, boosting circuit 18 comprises two stages: a first stage including an inductor for storing energy supplied by the welding power supply at an input voltage and a second stage including a capacitor for receiving and storing energy transfered from the first stage and for supplying an output voltage for powering the plasma cutting torch. The two stages together cause the output voltage to be higher than the input voltage.

As shown in FIG. 1, both the positive and negative terminals of power supply 16 are connected to a plasma control circuit 20 through boosting circuit 18. The negative terminal is connected to control circuit 20 through inductor L1, switch S2 and another inductor L2, as shown in FIG. 1. Switch S1 and capacitor C1 connect the positive terminal to the nodes between inductor L1, switch S2, and between switch S2 and inductor L2, respectively, as shown in FIG. 1. When switch S1 is closed and switch S2 is open, current from power supply 16 charges inductor L1. Then when switch S1 is opened and switch S2 is closed, the energy stored in inductor L1 supplies a current to charge capacitor C1. The values of inductor L1 and capacitor C1 as well as the timing of S1 and S2 are selected such that the voltage across capacitor C1 is greater than the voltage between the positive and negative terminals of power supply 16. The inductor L1 and capacitor C1 are such that, when the voltage across capacitor C1 is smoothed by another inductor L2, the resulting output voltage of boosting circuit 18 is within the range normally required for quality cutting using plasma cutting torches. The outputs of circuit 18 are applied to workpiece 12 and cutting torch 14 as shown in FIG. 1 for a cutting process in cutting workpiece 12. At most one of the two switches S1, S2 is closed at any one time. For example, L1 of 300 microhenries and C1 of 800 microfarads, S1, S2 on times of 0.1 milliseconds each (50% duty cycle) will roughly double the welding supply voltage at boost circuit output.

FIG. 2 is a schematic circuit diagram of the voltage boosting circuit 18, workpiece 12, cutting torch 14 of FIG. 1, where the plasma control circuit 20 and switches S1, S2 are shown in more detail to illustrate the invention. In addition, the circuit of FIG. 2 includes certain features which enable the power supply circuit to function properly. In reference to FIGS. 1 and 2, plasma control circuit 20 includes transformer T1, arc-starting circuit 22, resistor R1, relay contact K1A, transfer sensor 24, relay K1, feedback control system 28, reference 26, SCR driver 30, amplifiers A1, A2 and shunts SH1, SH2. Switch S1 includes silicon control rectifier SCR1, capacitor C2 and inductor L3, and switch S2 includes silicon control rectifier SCR2. Other plasma controls for gas and timing function are represented in block diagram form, item 44. These controls are needed for plasma cutting and are well known in the art but not important or unique to this invention.

SCR1 is turned on by driver 30 at node A. After SCR1 is turned on, it remains on for approximately one-half cycle of the resonant frequency of L3 and C2, where L3 and C2 commutate SCR1 off in resonant fashion. In other words, the on time for inductor L1 remains determined by the frequency of switching of SCR1 by driver 30. This energy is given by $\frac{1}{2}LI^2$ which is subsequently transferred to capacitor C1 when SCR2 is turned on in proper sequence and SCR1 turning off. Driver 30 controls SCR1, SCR2 in proper sequence so that at most one of them is turned on at any one time. When the boosting circuit 18 is turned off, driver 30 causes both switches to be turned off.

The remaining elements of circuit 20 are used to control the plasma cutting process. The arc starter 22 and transformer T1 initiate the plasma pilot arc in the torch 14 between the torch and its tip 14A. Pilot current therefore flows in conductor 42, R1 and relay contact K1A. When the torch is brought to the workpiece 12, the arc transfers so that current now flows between torch 14 and the workpiece 12, through shunt SH2. This current is amplified by amplifier A2 and sensed by sensor 24. Transfer sensor in turn operates relay K1 and relay contact K1A opens, thereby disconnecting the above described pilot arc generating circuit while current is flowing to the workpiece.

A reference voltage 26 is used to set the desired plasma current level. The reference voltage is compared by system 28 to the current signal (voltage across SH2) from amplifier A2. The feedback system then alters the frequency of the SCR drive signals from driver 30 to control the frequency for turning on SCR1, so as to control the amount of energy supplied to inductor L1. The amount of energy stored in inductor L1 is thereby increased or decreased. The energy stored in inductor L1 is transferred to capacitor C1, where the energy stored is given by $\frac{1}{2}CV^2$, where V is the voltage across the capacitor. Therefore, by controlling the on-/off times of switches S1, S2, the voltage V cross capacitor C1 can be controlled. Shunts SH1 and amplifier A1 monitor the input current in order to cease operation in the event of input current overload. Plasma gas control 44 controls the gas flow to torch 14. The above-described system for controlling the initiation of the pilot arc, the turning off of the pilot current after the arc has transferred to the workpiece, and control of the current level, is conventional, and will therefore not be described in any further detail.

FIG. 3 is a schematic circuit diagram of a plasma cutting torch power supply to illustrate one embodiment of the boosting circuit 18A. Circuit 18A is advantageous in that switch S2 of FIGS. 1 and 2 may be replaced by a diode S2 operating as a switch which is less expensive than an actual switch. Circuit 18A, however, requires a smoothing input filter capacitor C' to smooth the current from supply 16A; capacitor C' should be quite large and capable of handling large ripple currents. Capacitor C' smooths the current from power supply 16A when switch S1 isolates the inductor L1 from the power supply 16A.

Thus when switch S1 is on, inductor L1 is charged. When switch S1 is on, diode S2 is reverse biased so that no current will flow towards capacitor C1. Hence diode S2 prevents capacitor C1 from being charged when inductor L1 is being charged and permits the charging of capacitor C1 when inductor L1 is being discharged.

When switch S1 is open, the voltage across inductor L1 changes polarity and inductor L1 charges capacitor C1 through diode S2 to sufficiently high voltage for a cutting process. The sudden reversal of voltage polarity across inductor L1 causes a flyback on an oscilloscope for showing the output voltage of circuit 18A so that the configuration of circuit 18A may be called the flyback configuration.

FIG. 4 is a schematic circuit diagram of a plasma cutting torch power supply to illustrate yet another embodiment of the boosting circuit, labeled 18B. Circuit 18B is similar to circuit 18A of FIG. 3 in that it also requires an input smoothing filter capacitor C' and employs a diode S2 instead of a switch. Circuit 18B differs from circuit 18A in that L1 is now a transformer having a secondary coil connected to the output stage of circuit 18B, where the primary coil of L1 is connected to its input stage connected to the positive and negative terminals of supply 16B. Furthermore, a certain point in each of the primary and secondary coil circuits are connected to ground. Similarly, the negative terminal of supply 16 and workpiece 12 are all connected to ground. Power supply 10B comprising welding supply 16B and boosting circuit 18B is advantageous in that torch 14 is electrically isolated from supply 16B and that the welding supply need not be isolated from ground as is the case in supply 10A of FIG. 3. Furthermore, only one cable needs to be run connecting supply 16B and boosting circuit 18B and only one cable connecting circuit 18B and torch 14. In contrast, the power supplies 10 of FIG. 1 and 10A of FIG. 3 both require two cables to be run to connect the welding power supply, the boosting circuit, and the cutting torch and workpiece. Where the cutting is performed at remote locations at a considerable distance from the power source, having to run one fewer cable is a significant advantage. In contrast to the circuit 18A, circuit 18B does require a secondary winding on L1. Shunts SH1, SH2 of the plasma control circuit 20 shown in detail in FIG. 2 may be located as shown in FIG. 4.

FIG. 5 is a schematic circuit diagram of a plasma cutting torch power supply to illustrate a third alternative embodiment of the invention. Again boosting circuit 18C has an input stage and an output stage coupled together through the primary and secondary coils of a transformer T. Switches S1, S1' toggle so that when one is on, the other is off, and vice versa. When switch S1 is on, inductor L1 is charged. When switch S1' is on instead, inductor L1 is discharged through the primary coil of transformer T so that the current through the secondary coil of the transformer charges capacitor C1. S2 is a diode so that current will flow in the secondary coil of transformer T only when inductor L1 is being discharged and not when L1 is being charged. Again, a certain point in both the output and input stages of circuit 18C is grounded and so are the negative terminal of supply 16C and the workpiece 12. By having a common reference voltage in supply 16C, both input and output stages of circuit 18C and workpiece 12, a single connecting line is adequate for connecting supply 16C to boosting circuit 18C and a single output line is adequate for connecting circuit 18C to torch 14.

By using a transformer T to couple the first inductive stage and the second capacitive stage, torch 14 is electrically isolated from supply 16C. The plasma cutting torch power supply 10C is advantageous in that no input filter capacitor is required, in that inexpensive diode S2 may be used and in that the welding power 16C need not be isolated from ground. It does, however, require an additional switch S1' and transformer T. Furthermore, a diode D1 is required to keep the core of transformer T energized when switch S1' is open. Current through diode D1 provides the reset current for the transformer core.

FIG. 6 is a schematic circuit diagram of plasma cutting torch power supply 10D for supplying torch 14 and workpiece 12 to illustrate a fourth alternative embodiment of the invention. Circuit 18D differs from 18C of FIG. 5 in that inductor L1 is connected to transformer T in a center tap type arrangement in the first inductive stage. Similarly, in the capacitive second stage, capacitor C1 is also connected to the secondary coil of transformer T in a center tap type arrangement. Such arrangement automatically causes current to flow in both the primary and secondary coils of transformer T so that no reset current is required for energizing the transformer core. Therefore, no diode is necessary as compared to circuit 18C. S2, S2' are both diodes. Switches S1, S1' can be both turned "on" but alternate every other cycle for the "off" state as illustrated in the Table below.

|  |  | S | S' |
| --- | --- | --- | --- |
| cycle one | $t_1$ | on | on |
| cycle two | $t_2$ | off | on |
| cycle three | $t_3$ | on | on |
| cycle four | $t_4$ | on | off |
| cycle five | $t_5$ | on | on |
| cycle six | $t_6$ | off | on |

Thus when switches S1, S1' are both "on," inductor L1 is charged by supply 16D through each leg of the primary coil of transformer T. When switch S1 is turned "off" and switch S1' remains on, inductor L1 supplies current to the lower leg of the primary coil of transformer T through switch S1' to charge capacitor C1. Similarly, when switch S1 remains on and switch S1' turns "off," current from L1 flows through the upper leg of the primary coil of the transformer to charge capacitor C1. Hence when inductor L1 is being charged, diodes S2, S2' prevent capacitor C1 from being charged while when inductor L1 is being discharged, one of the two diodes permits capacitor C1 to be charged. Again the input inductive and output capacitive stages of circuit 18D are both grounded as are the negative terminal of supply 16D and workpiece 12. This permits a single connecting line to connect supply 16D and circuit 18D and a single output line connecting circuit 18D to torch 14. Since a transformer is used to couple the two stages, torch 14 is electrical isolated from supply 16D. Supply 10D of FIG. 6 is advantageous in that S2, S2' are both diodes, in that no input filter capacitor is necessary and that a single cable needs to be run between the power supply and torch 14. Supply 10D does require an additional switch S1', transformer T and an extra diode S2'.

In the above-described embodiments, certain circuit components are shown connected to the positive terminal of the welding power supply and to the cutting torch, while other components are shown connected to ground or negative terminal of the welding power supply and the workpiece. It will be understood that in many instances, the positive and negative terminals of the welding power supply may be switched in position without materially affecting the construction of the circuits. Similarly, the torch and the workpiece may be exchanged in position as well without affecting the construction of the circuit. The inductive and capacitive stages of the boosting circuit may be grounded at different points than those shown. Furthermore, instead of being connected to ground, all that is required is a common reference voltage level for the welding power supply, the boosting circuit and the workpiece. Such and other modifications may be made without departing from the scope of the invention which is to be limited only by the appended claims.

What is claimed is:

1. A device for use with a DC welding power supply for supplying power to a plasma cutting torch for cutting a workpiece, said device comprising:
   a first stage including an inductor for storing power supplied by the welding power supply at an input voltage; and
   a second stage including a capacitor for storing power stored in the first stage and for supplying power at an output voltage to a plasma cutting torch for cutting the workpiece, wherein the two stages cause the output voltage to be higher than the input voltage; and
   wherein said first stage includes a first switch and the second stage includes a second switch, and wherein when the first switch is closed, the inductor is charged by energy from the welding power supply, and when the second switch is closed, the first switch is open, and energy stored in the inductor charges the capacitor to a voltage suitable for powering the plasma cutting torch.

2. The device of claim 1, further comprising feedback control means for alternately closing and opening the two switches, so that at most one switch is closed at any time.

3. The device of claim 1, further comprising means for smoothing the output.

4. The device of claim 1, said two stages coupled through said inductor, wherein said second stage includes a diode for preventing the charging of the capacitor when said inductor is being charged and for permitting the charging of said capacitor when said inductor is being discharged.

5. The device of claim 1, further comprising a transformer for coupling said two stages, wherein said second stage includes a diode for preventing the charging of the capacitor when said inductor is being charged and for permitting the charging of said capacitor when said inductor is being discharged.

6. The device of claim 1, said two stages coupled through said inductor, wherein said first stage includes an input filter capacitor and a switch for connecting the welding power supply to the inductor, said input filter capacitor serving as a current smoothing element for the welding power supply when said switch isolates the inductor from the welding power supply.

7. The device of claim 1, further comprising a transformer for coupling said two stages, wherein said first stage includes an input filter capacitor and a switch for connecting the welding power supply to the inductor, said input filter capacitor serving as a current smoothing element for the welding power supply when said switch isolates the inductor from the welding power supply.

8. The device of claim 1, wherein the welding power supply has two power supply terminals, and wherein one of the two terminals, the workpiece, and the two stages are each connected to a reference voltage, said device further comprising:
   an input line for connecting the two stages to the terminal of the welding power supply not connected to the reference voltage; and
   an output line for connecting the two stages to the cutting torch.

9. The device of claim 1, further comprising a transformer for coupling said two stages and an input line for connecting the welding power supply to the transformer in a centertap arrangement through said inductor.

10. The device of claim 1 wherein said second stage supplies power to the cutting torch substantially continuously for cutting the workpiece.

11. The apparatus of claim 1, wherein one of the two switches includes a diode.

12. An apparatus for supplying power to a plasma cutting torch to cut a workpiece, said apparatus comprising:
   a DC welding power supply for supplying a first voltage output; and
   voltage boosting means responsive to said first voltage output to supply power at a second voltage output higher than the first voltage output, said power at said second voltage output suitable for powering said cutting torch to cut the workpiece, wherein said second voltage is within a range which is suitable for powering a cutting torch to cut a workpiece, voltages in said range being substantially higher than voltages suitable for powering a welding torch for welding a workpiece.

13. The apparatus of claim 12, said voltage boosting means comprising:
   a first stage including an inductor for storing energy supplied by the welding power supply at the first voltage; and
   a second stage including a capacitor for receiving and storing energy transferred from the first stage and for supplying an output voltage for powering a plasma cutting torch, wherein the two stages cause the output voltage to be higher than the first voltage.

14. The apparatus of claim 13, wherein said first stage includes a first switch and the second stage includes a second switch, and wherein when the first switch is closed, the inductor is charged by energy from the welding power supply, and when the second switch is closed, the first switch is open, and energy stored in the inductor charges the capacitor to a voltage suitable for powering the plasma cutting torch.

15. The apparatus of claim 14, further comprising feedback control means for alternately closing and opening the two switches, so that at most one switch is closed at any time.

16. The apparatus of claim 13, further comprising means for smoothing the output.

17. The apparatus of claim 13, said two stages coupled through said inductor, wherein said second stage includes a diode for preventing the charging of the capacitor when said inductor is being charged and for permitting the charging of said capacitor when said inductor is being discharged.

18. The apparatus of claim 13, further comprising a transformer for coupling said two stages, wherein said second stage includes a diode for preventing the charging of the capacitor when said inductor is being charged and for permitting the charging of said capacitor when said inductor is being discharged.

19. The apparatus of claim 13, said two stages coupled through said inductor, wherein said first stage includes an input filter capacitor and a switch for connecting the welding power supply to the inductor, said input filter capacitor serving as a current smoothing element for the welding power supply when said switch isolates the inductor from the welding power supply.

20. The apparatus of claim 13, further comprising a transformer for coupling said two stages, wherein said first stage includes an input filter capacitor and a switch for connecting the welding power supply to the inductor, said input filter capacitor serving as a current smoothing element for the welding power supply when said switch isolates the inductor from the welding power supply.

21. The apparatus of claim 13, wherein the welding power supply has two power supply terminals, and wherein one of the two terminals, the workpiece, and the two stages are each connected to a reference voltage, said apparatus further comprising:
    an input line for connecting the two stages to the terminal of the welding power supply not connected to the reference voltage; and
    an output line for connecting the two stages to the cutting torch.

22. The apparatus of claim 13, further comprising a transformer for coupling said two stages and an input line for connecting the welding power supply to the transformer in a centertap arrangement through said inductor.

23. The apparatus of claim 12, said voltage boosting means further comprising means for smoothing the output.

24. The apparatus of claim 12 wherein said voltage boosting means supplies power to the cutting torch substantially continuously for cutting the workpiece.

25. The apparatus of claim 14, wherein one of the two switches includes a diode.

26. An apparatus for supplying power to a plasma cutting torch to cut a workpiece, said apparatus comprising:
    a DC welding power supply for supplying a first voltage output; and
    electrically coupled voltage boosting means responsive to said first voltage output to supply power at a second voltage output higher than the first voltage output, said power at said second voltage output suitable for powering said cutting torch substantially continuously to cut the workpiece.

27. The apparatus of claim 26, wherein said boosting means employs no transformer coupling.

28. An apparatus responsive to a first voltage from a DC welding power supply for supplying a second voltage output for supplying power to a plasma cutting torch to cut a workpiece, said apparatus comprising electrically coupled voltage boosting means responsive to said first voltage output to supply power at a second voltage output higher than the first voltage output, said power at said second voltage output suitable for powering said cutting torch substantially continuously to cut the workpiece, said boosting means employing no transformer coupling.

* * * * *